US006316890B1

(12) United States Patent
Gmeilbauer

(10) Patent No.: US 6,316,890 B1
(45) Date of Patent: Nov. 13, 2001

(54) HAND CONTROLLED MOTOR DRIVEN OSCILLATING DEVICE

(76) Inventor: Engelbert Gmeilbauer, Stocketweg 1, Seefeld D-82229 (DE)

( * ) Notice: Subject to any disclaimer, the term of this patent is extended or adjusted under 35 U.S.C. 154(b) by 0 days.

(21) Appl. No.: 09/485,261

(22) PCT Filed: Aug. 4, 1998

(86) PCT No.: PCT/DE98/02242

§ 371 Date: Mar. 2, 2000

§ 102(e) Date: Mar. 2, 2000

(87) PCT Pub. No.: WO99/07522

PCT Pub. Date: Feb. 18, 1999

(30) Foreign Application Priority Data

Aug. 5, 1997 (DE) ............................................. 197 33 796

(51) Int. Cl.[7] ........................................................ H02P 1/00

(52) U.S. Cl. ............................ 318/280; 388/937; 310/50; 173/205

(58) Field of Search ............................ 318/280; 388/937; 310/50; 451/357; 173/205

(56) References Cited

U.S. PATENT DOCUMENTS

| | | | |
|---|---|---|---|
| 2,350,098 | | 5/1944 | Decker . |
| 3,571,874 | | 3/1971 | Von Arx . |
| 4,347,450 | | 8/1982 | Colligan . |
| 4,516,361 | | 5/1985 | Gringer . |
| 4,685,252 | | 8/1987 | Ponce . |
| 4,748,872 | | 6/1988 | Brown . |
| 4,782,632 | | 11/1988 | Matechuk . |
| 4,829,719 | | 5/1989 | Braselton . |
| 4,920,702 | | 5/1990 | Kloss et al. . |
| 5,144,774 | | 9/1992 | Conboy . |
| 5,398,454 | | 3/1995 | Berner . |
| 5,513,709 | * | 5/1996 | Fisher .................................. 173/205 |
| 5,957,019 | * | 9/1999 | Hanaas ................................ 173/205 |

FOREIGN PATENT DOCUMENTS

| | | |
|---|---|---|
| 93 19 263.0 | 4/1994 | (DE) . |
| 94 10 754.8 | 11/1994 | (DE) . |

* cited by examiner

*Primary Examiner*—Karen Masih
(74) *Attorney, Agent, or Firm*—Cohen, Pontani, Lieberman & Pavane

(57) ABSTRACT

A hand-controlled motor-driven oscillating device having an elongate casing, an electric motor having an output shaft, and an oscillating unit having an output shaft and being connected in drive terms to the output shaft of the electric motor. The electric motor and the oscillating motor and the oscillating unit are arranged in the casing in succession in a direction of the longitudinal access of the casing so as to form a grip section and an oscillating head section. The output shaft of the oscillating unit projects out of the casing. The grip section is connected to the oscillating head section so that the grip section can be pivoted, in terms of its angular position, with respect to the oscillating head section and the oscillating unit output shaft.

15 Claims, 2 Drawing Sheets

HAND CONTROLLED MOTOR DRIVEN OSCILLATING DEVICE

BACKGROUND OF THE INVENTION

1. Field of the Invention

The invention relates to a hand-controlled, motor-driven oscillating device as described in the as used in particular as a hand-held grinding device, to the output shaft of which the required tool, such as an abrasive disk, a cutting wheel, saw blades, scraping blades and the like, can be attached as required.

2. Discussion of the Prior Art

Various designs of such oscillating devices are known (cf., for example, U.S. Pat. Nos. 2,350,098, 4,920,702 and DE German reference 94 10 754.8 U1). However, such a device always comprises an elongate casing in which an electric motor and an oscillating unit are arranged in axial succession. An output shaft projects out of the casing of the oscillating unit, to which tools can be attached. A corresponding tool is in this case attached rigidly to the output shaft and, if the output shaft is arranged perpendicular to the longitudinal axis of the device, is always aligned substantially parallel to the longitudinal axis of oscillation, in particular if an abrasive disk or a cutting wheel is being used. The tool cannot adopt any other position with respect to the device, so that the tool attached to the oscillating device is difficult to use in restricted working areas, and indeed this is often impossible, in particular because the grip section of the casing, which is parallel to the working surface, is in the way.

Grinding devices in which the abrasive tool is pivotably connected, via an articulated joint, to a handle or to a linkage leading to an oscillating device, are also known from U.S. Pat. Nos. 4,516,361 and 4,829,719. This makes working inefficient, on the one hand, and uncomfortable and inexact, on the other hand.

SUMMARY OF THE INVENTION

Therefore, the object of the invention is to provide an oscillating device of the above-mentioned generic type which allows comfortable, accurate, and fatigue-free working which is optimum even in restricted working areas.

Consequently, the grip casing section is arranged so that it can pivot, in terms of its angular position, with respect to the oscillating head section together with the device output shaft. As a result, it is possible to adjust the working angle, i.e. the tool attached to the output shaft, for example the abrasive disk, can adopt a different angular position with respect to the grip section and therefore with respect to the hand of the operator, thus allowing easier working which is also less encumbered by obstacles.

In a first, highly advantageous design, the oscillating device, in the zone between the motor and the oscillating unit, i.e. between the grip section containing the motor and the oscillating head section, can be bent away about a transverse pivot axis which is substantially parallel to the machining surface and preferably intersects the longitudinal axis of the device. Consequently, the oscillating head, to which the particular tool, depending on the embodiment, is attached more or less closely via the oscillating device output shaft projecting out of the head, can be pivoted or adjusted in terms of its angle, about a transverse axis, with respect to the remaining grip section. As a result, the position of the grip section, which in this case is at the same time the motor section of the device, with respect to the oscillating head part bearing the tool, can be changed in such a way that it can be moved, for example, into a position of 45° or 90° with respect to the working surface. The tool/oscillating device combination thus takes up significantly less space when working and can be used even in restricted areas and relatively inaccessible locations. The fact that the working angle, i.e. the angle between the grinding surface and the grip section of the device, can thus be optimally adjusted makes it possible to work more comfortably, more accurately and therefore with less fatigue.

According to a refinement of the inventive concept, an element which transmits the rotary movement at an angle, e.g. a universal joint, is provided on the motor output shaft in the area of the pivot axis. Furthermore, it is advantageous if the shaft which leads from the universal joint is a telescopic shaft, so that the rotating drive movement of the electric motor can be transmitted virtually unchanged to the oscillating unit provided in the head section, unaffected by the corresponding angular setting of the oscillating head section.

In order to allow an optimum unimpeded pivoting or adjustment movement between the two sections of the device, the two sections are interrupted and, if appropriate, spaced apart, in terms of their casing, in the pivot axis zone, the two sections being connected to one another by means of at least one pair of pivot arms. These pairs of pivot arms may be lateral lugs on the respective casing sections, i.e. may be formed integrally with the sections, in which case only a partial interruption is present. However, the respective casing sections may also end smoothly at their end sides, from each of which a pivot arm which is embedded in the casing wall material or is fixedly connected thereto projects. This ensures robust, fault-free pivoting.

It is advantageous if the pivoting movement of the two device or casing sections with respect to one another can, if appropriate, take place freely or if this can be effected at predetermined angular positions, e.g. at 10° intervals. The corresponding angular position can be fixed, so that it is possible to work safely, in a known way, for example by means of spring latching fixtures or other latching features, which are released by the application of a suitable pivot force or by means of a latching button which can be actuated from the outside. Consequently, the adjustment can be effected very quickly and without problems in a simple manner according to the required angular position of the oscillating head section with respect to the grip section.

It is advantageous if the two casing sections, namely the oscillating head section and the casing of the grip section, at their end sides, are at a distance from one another and a flexible casing section, e.g. a bellows, is arranged between the two end sides. This allows an unimpeded pivoting movement combined with simultaneous correct functioning of the moving parts, in particular the rotating parts, such as the motor shaft and universal joint, while at the same time providing a pleasant appearance.

According to a further highly advantageous fundamental embodiment of the invention, a separate grip section is provided, which is pivotably attached to the drive casing which contains the drive motor and the oscillating unit. In this case, the power can be supplied via the grip section, and a corresponding switch may be provided on the latter. Since the drive casing and the grip section are in practice two separate parts which are simply pivotably connected to one another by means of an articulated joint, it is possible to make the drive casing smaller and more sturdy. In this case, the motor, the oscillating unit and the output shaft are arranged axially in succession and in an axial alignment in this drive casing, specifically in such a way that the common axis is perpendicular to the machining surface, particularly in the case of grinding using the end side of an abrasive disk.

The grip section may be connected to the drive casing in two advantageous arrangements. However, the pivot bearing, comprising, for example, a bearing block which is attached to or formed integrally on the drive casing and a grip-section bearing fork, or vice versa, is always designed in such a way that pivoting through at least 90° is possible, i.e., as seen in the working position, for example out of a position in which the grip section is parallel to the working surface into a position which is perpendicular to the first position.

For example, the grip-section pivoting attachment may be provided at the drive casing perimeter, i.e. in a radial alignment. However, it may also be provided at the top end side of the casing, axially opposite to the device output shaft, i.e. in an axial alignment. However, there is always the possibility of pivoting through at least 90°, and with the axial alignment pivoting through more than 180° may even be possible.

Particularly good handling can be achieved if the grip section is not simply straight in its longitudinal extent, but rather has a step. This step or offset is to be made in such a way that, depending on whether there is a radial or axial alignment, this step practically engages over the drive casing in a suitable manner. In the case of a radial arrangement, the step is directed upward, so that on the one hand there is a greater freedom for the fingers in relation to the machining surface, while on the other hand in the vertical position, i.e. when pivoted through 90°, the grip is drawn closer to the axis of the drive casing, as a result, in this position, the fist can grip securely around the vertical handle so that the device can be guided safely with a uniform working pressure. In the case of an axial arrangement, the step in the grip section is arranged toward the bottom, so that it is possible to grip at a lower level when the grip section is horizontally aligned, allowing the device to be guided, for example, more smoothly and with less tilting.

It should also be noted here that by dint of the vertical arrangement of the entire drive casing above, for example, an abrasive disk, it is possible for the entire weight of the device to rest on the abrasive disk, so that there is no need to exert any additional grinding pressure, while even when working it is not necessary for a large proportion of the weight of the device to be continuously supported by hand. This makes the device easy to handle without fatigue.

BRIEF DESCRIPTION OF THE DRAWINGS

The invention is explained in more detail below on the basis of a plurality of exemplary embodiments and with reference to the drawing, in which.

DETAILED DESCRIPTION OF THE PREFERRED EMBODIMENTS

Figure 1:
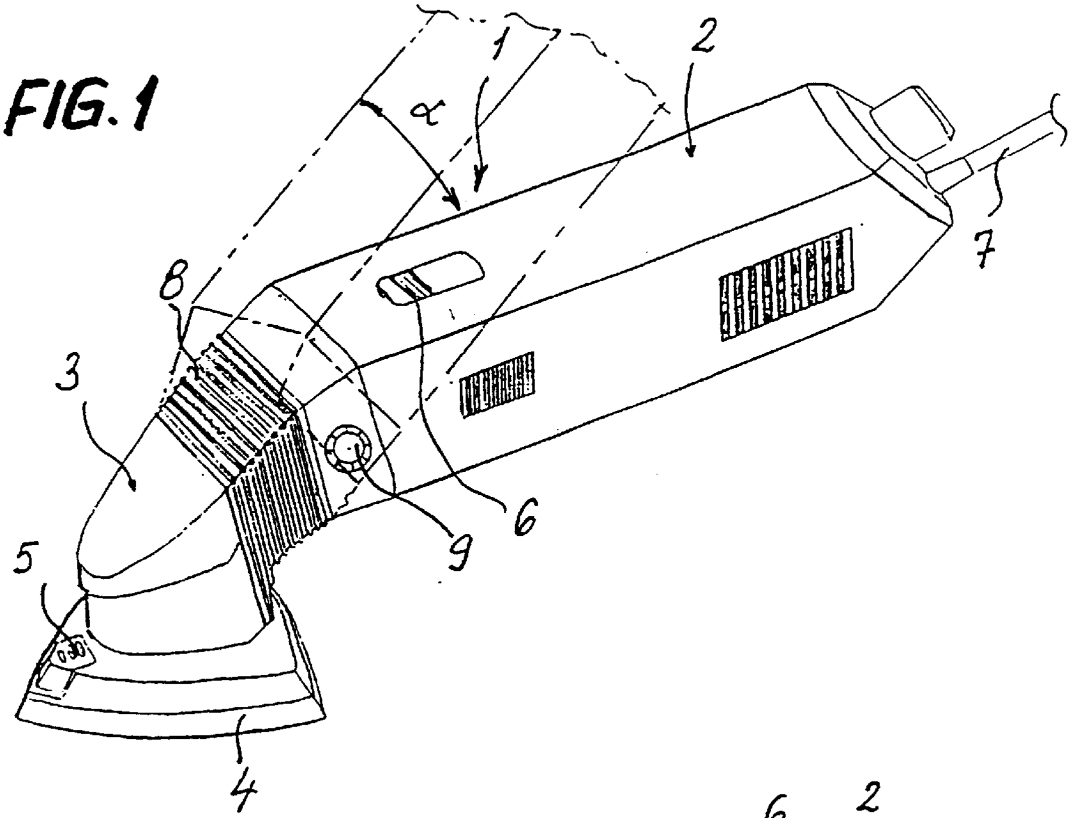
FIG. 1 shows a perspective view of a first embodiment of an oscillating device according to the invention, with an articulatedly mounted oscillating head section.
Figure 3:
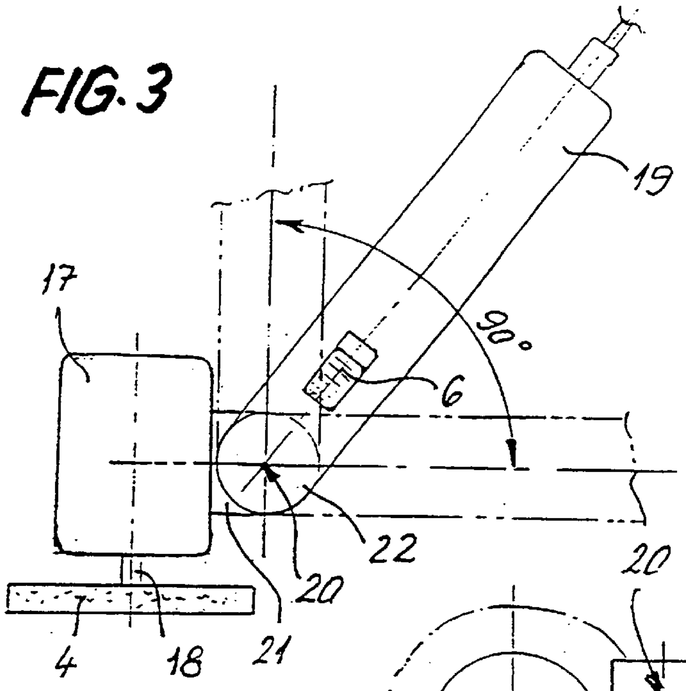
FIG. 3 shows a side view of a second embodiment of an oscillating device, with an articulatedly mounted, separate grip section.
Figure 4:
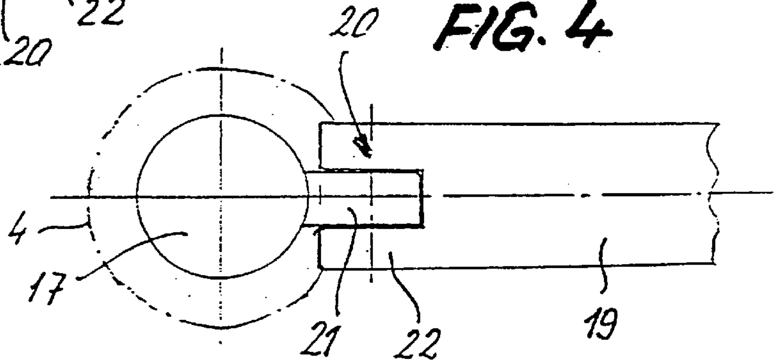
FIG. 4 shows a plan view of the embodiment shown in FIG. 3, with a radially articulated grip section.

As can be seen from FIG. 1, in a first embodiment the oscillating device according to the invention comprises substantially the same basic components as known devices. Thus, it has a device casing 1, which comprises a grip section 2, which contains an electric drive motor (not shown) and, at the same time, can be gripped in order for the device to be held and handled, and an oscillating head section 3, which contains an oscillating device (likewise not shown). These two casing sections 2, 3 are arranged so that they extend substantially in axial succession in the longitudinal direction, an output shaft (not shown here, but cf. FIG. 3) projecting laterally out of the oscillating head section 3, on which output shaft, for example, an abrasive disk 4 is fixedly arranged by means of an attachment device with an actuating lever 5. It can be seen that a power cable 7 and a switch 6 are provided on the grip section, 2 by means of which, firstly, the power is supplied and, secondly, the device is switched on and off.

Figure 2:
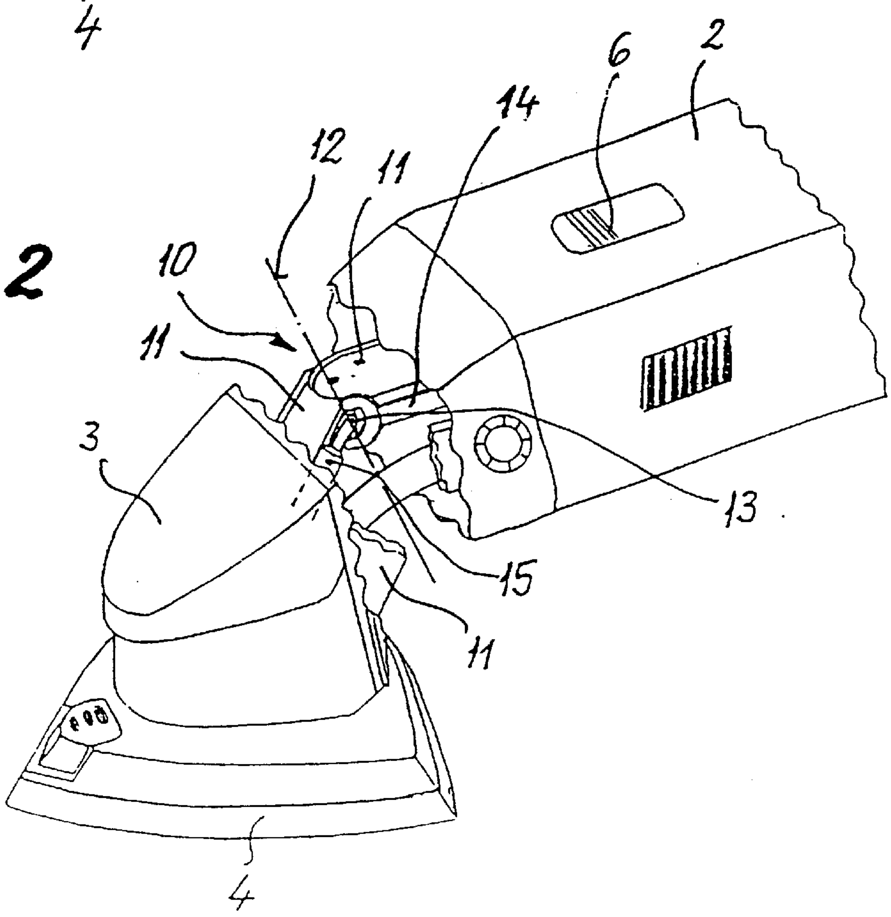
FIG. 2 shows a view as in FIG. 1, partially in section.

A pivoting unit, which cannot be seen in FIG. 1 since it is covered by a bellows 8, is provided between the grip section 2 and the oscillating head section 3. A latching head 9 is provided, via which, for example, the positioning latch can be released to allow pivoting. FIG. 2 shows a possible structure of this pivoting unit 10. The two casing sections 2, 3 are arranged so that they can pivot with respect to one another about a common pivot axis 12 which runs transversely with respect to the longitudinal axis of the device, by means of two pairs of lateral pivot arms 11. In order to divert the angle of the rotary movement from the drive motor to the oscillating unit together with the pivoting movement of the casing sections, there is a universal joint 13 which connects the output shaft 14 of the drive motor to a drive shaft 15 of the oscillating unit. In this case, the drive shaft 15 is additionally designed as a telescopic shaft, so that deviations in length which arise as a result of the pivoting are accurately compensated for by the shaft 15. It can be seen that, when working, the oscillating head section 3, together with the abrasive disk 4, can remain in the same position, while the grip section 2 can be moved out of the normal horizontal alignment into, for example, a 45°or even 90° alignment, without the vibrating drive of the vibrating disk suffering from this movement.

The exemplary embodiments illustrated in FIGS. 3 to 6 show a further basic embodiment of the device according to the invention. In this embodiment, both the drive motor and the oscillating unit are arranged in a single drive casing 17, in such a way that this drive casing 17 is arranged practically vertically/perpendicular to the tool, i.e. the abrasive disk 4. It can be seen that the drive casing 17 with the oscillating output shaft 18 reaching out of it and the abrasive disk 4 are arranged in axial succession, so that during the grinding machining the drive casing 17 stands vertically above the abrasive disk 4. A grip section 19 is pivotably attached to the casing 17 by means of a pivoting device 20, and it can be seen in particular from FIG. 4 that this pivoting device 20 comprises a bearing block 21 which is attached to the drive casing 17 and a grip-section bearing fork 22. In the embodiment illustrated in FIGS. 3 and 4, the bearing-pivoting device 20 is arranged radially with respect to the casing 17. It can be seen that the grip section 19 can be moved without problems out of the horizontal alignment, i.e. the alignment in which it is parallel to the abrasive disk 4, at least into a vertical position, which, as can be seen, saves significant amounts of space.

Figure 5:
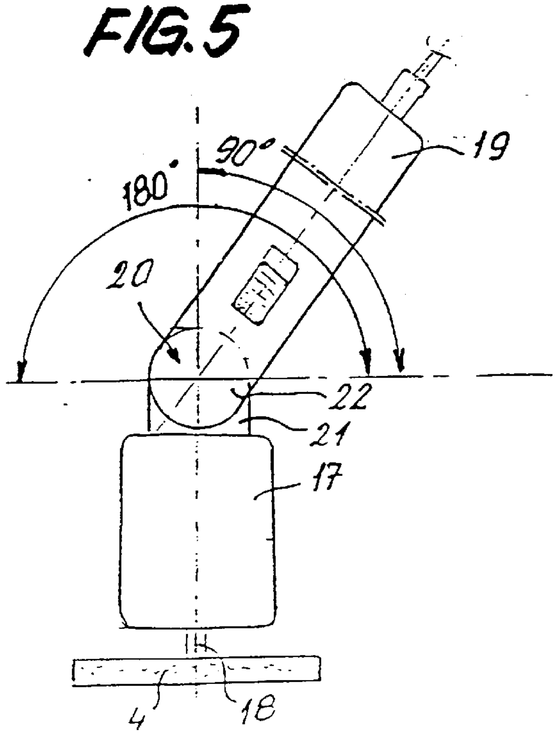
FIG. 5 shows a view of a similar embodiment to that shown in FIG. 3, but with an axially articulated grip section.

In the exemplary embodiment illustrated in FIG. 5, the pivoting device 20 is arranged above the top end side of the casing 17, the bearing block 21 being attached to or formed integrally with the end face of the drive casing 17. It can be seen that in this case a pivoting movement, i.e. a change in position of the grip section 19, of at least 180° is possible and that, in the 90° arrangement, the axis of the grip section 19 is in line with the drive casing 17 and the abrasive disk.

Figure 6:
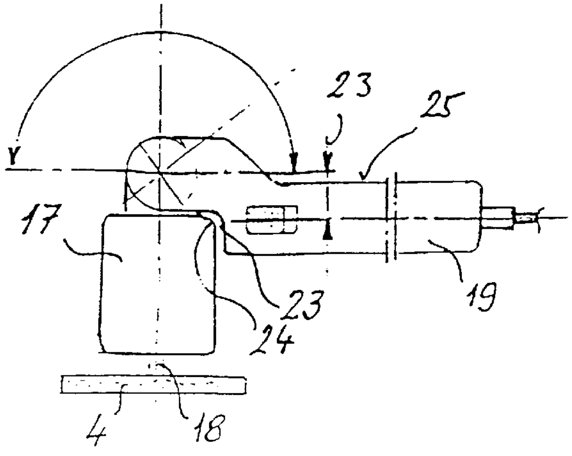
FIG. 6 shows a view of an embodiment similar to that shown in FIG. 5, but with a stepped grip section.

It can be seen from FIG. 6 that, in an embodiment similar to that shown in FIG. 5, the grip section 15 may be of offset or stepped design. In this case, the step 23 in the grip section 19 is guided around the outer, top corner 24 of the casing 17, in such a way that, in the horizontal alignment, a correspondingly lower grip length 25 of the grip section 19 is available.

The invention is not limited by the embodiments described above which are presented as examples only but can be modified in various ways within the scope of protection defined by the appended patented claims.

What is claimed is:

1. A hand-controlled, motor-driven oscillating device, comprising:

an elongate casing; an electric motor having an output shaft; and an oscillating unit having an output shaft and being connected in drive terms on the output shaft of the electric motor, the electric motor and the oscillating unit being arranged in the casing in succession in a direction of a longitudinal axis of the casing so as to form a grip section and an oscillating head section, the output shaft of the oscillating unit projecting out of the casing, the grip section being connected to the oscillating head section so that the grip section can be pivoted, in terms of its angular position, with respect to the oscillating head section and the oscillating unit output shaft.

2. An oscillating device as defined in claim 1, wherein a transverse pivot axis is arranged in a zone between the electric motor and the oscillating unit so as to intersect the longitudinal axis of the casing, the electric motor being arranged in the grip section so that the grip section and the oscillating head section can be pivoted with respect to one another.

3. An oscillating device as defined in claim 2, and further comprising an element provided on the motor shaft in an area of the pivot axis so as to allow the angled rotary movement to be transmitted.

4. An oscillating device as defined in claim 3, wherein the element is a universal joint.

5. An oscillating device as defined in claim 4, wherein the drive shaft, which leads from the universal joint to the oscillating unit, is a length-compensating telescopic shaft.

6. An oscillating device as defined in claim 2, and further comprising at least one pair of pivot arms arranged to connect the casing of the grip section to the casing of the oscillating head section.

7. An oscillating device as defined in claim 6, wherein two pairs of pivot arms are arranged symmetrically right and left of the drive and output shafts.

8. An oscillating device as defined in claim 6, wherein end sides of the two casting sections which are positioned opposite one another are at a distance from one another so as to allow a maximum possible pivoting movement, and further comprising a flexible casing section provided between the two casing end sides.

9. An oscillating device as defined in claim 8, wherein the flexible casing section is a bellows.

10. An oscillating device as defined in claim 1, wherein the grip section is a separate section pivotably attached by a pivoting attachment to the casing which contains the drive motor and the oscillating unit, and is substantially perpendicular to an abrasive machining surface of the oscillating unit, a power supply being effected via the grip section and a corresponding switch being provided on the grip section.

11. An oscillating device as defined in claim 10, wherein the grip section is pivotably adjustable on the casing via a bearing block attached to the casing and a corresponding grip-section bearing fork so that the grip section can pivot through at least 90° from a perpendicular position to an axially parallel position with respect to the axis of the device.

12. An oscillating device as defined in claim 11, wherein the grip-section pivoting attachment is arranged at a perimeter of the drive casing in radial alignment with respect to the drive casing.

13. An oscillating device as defined in claim 11, wherein the grip-section pivoting attachment is provided at a top end side of the casing.

14. An oscillating device as defined in claim 11, wherein the grip section, in its overall longitudinal extent, has a step, so that the grip section has a grip length, in a horizontal alignment, that extends at a distance, which is equal to the step, lower than a bearing pivot point.

15. An oscillating device as defined in claim 1, and further comprising latching means for fixing the angular position of the grip section.

* * * * *